US012743669B2

(12) United States Patent
Lin et al.

(10) Patent No.: US 12,743,669 B2
(45) Date of Patent: Sep. 22, 2026

(54) METHOD FOR CONTROLLING ACTUAL CONSTRUCTION OF A CONSTRUCTION SITE BASED ON MULTI-MODALITY TEMPORAL INFORMATION FUSION, AND ELECTRONIC DEVICE

(71) Applicants: Hangzhou Newgrand Technology Co., Ltd., Hangzhou City (CN); Zhejiang University, Hangzhou (CN); Hangzhou HaoLink Intelligent Technology Co., Ltd., Hangzhou City (CN)

(72) Inventors: Lanfen Lin, Hangzhou (CN); Hongyi Wang, Hangzhou (CN); Hao Sun, Hangzhou (CN); Zhongshao Shi, Hangzhou (CN); Hong Xu, Hangzhou (CN)

(73) Assignees: HANGZHOU NEWGRAND TECHNOLOGY CO., LTD., Hangzhou (CN); ZHEJIANG UNIVERSITY, Hangzhou (CN); HANGZHOU HAOLINK INTELLIGENT TECHNOLOGY CO., LTD., Hangzhou City (CN)

( * ) Notice: Subject to any disclaimer, the term of this patent is extended or adjusted under 35 U.S.C. 154(b) by 0 days.

(21) Appl. No.: 18/735,607

(22) Filed: Jun. 6, 2024

(65) Prior Publication Data

US 2025/0005475 A1 Jan. 2, 2025

(30) Foreign Application Priority Data

Jun. 30, 2023 (CN) ......................... 202310788030.2

(51) Int. Cl.
*G06Q 10/0631* (2023.01)
*G06V 10/62* (2022.01)
(Continued)

(52) U.S. Cl.
CPC ....... *G06Q 10/06313* (2013.01); *G06V 10/62* (2022.01); *G06V 10/764* (2022.01); *G06V 10/806* (2022.01)

(58) Field of Classification Search
CPC ............. G06Q 10/06313; G06Q 50/08; G06Q 10/06317; G06V 10/806; G06V 10/62; G06V 10/764
See application file for complete search history.

(56) References Cited

U.S. PATENT DOCUMENTS 7,752,065 B2 * 7/2010 Buzz ................ G06Q 10/06313 703/1
2018/0012125 A1 * 1/2018 Ladha .................... G06N 3/044
(Continued)

FOREIGN PATENT DOCUMENTS

CN 113780823 A * 12/2010
CN 107679310 A 2/2018
(Continued)

OTHER PUBLICATIONS

Huang, Rong, et al. "Temporal comparison of construction sites using photogrammetric point cloud sequences and robust phase correlation." Automation in Construction 117 (2020): 103247. (Year: 2020).*
(Continued)

*Primary Examiner* — Thomas Yih Ho
(74) *Attorney, Agent, or Firm* — McDonald Hopkins LLC

(57) ABSTRACT

An engineering progress determination method based on a multi-modality temporal information fusion includes: acquiring current engineering progress information of multiple modalities and corresponding historical engineering progress information for current engineering progress information of each modality; subsequently, extracting modality-specific temporal features from both current engineering progress information and historical engineering progress
(Continued)

information; these modality-specific temporal features are then fed into a dimension decoupling-based multi-modality fusion module, resulting in fused multi-modality temporal information; and the current engineering progress is then determined based on this fused information.

6 Claims, 3 Drawing Sheets

(51) Int. Cl.
*G06V 10/764* (2022.01)
*G06V 10/80* (2022.01)

(56) References Cited

U.S. PATENT DOCUMENTS

| | | | | |
|---|---|---|---|---|
| 2019/0325089 | A1* | 10/2019 | Golparvar-Fard | G06T 19/003 |
| 2021/0183128 | A1* | 6/2021 | Miller | G06Q 10/06313 |
| 2023/0281527 | A1* | 9/2023 | Cella | G06V 20/17 705/7.17 |

FOREIGN PATENT DOCUMENTS

| | | | | | |
|---|---|---|---|---|---|
| CN | 109670795 | Z | | 4/2019 | |
| CN | 112052992 | A | | 12/2020 | |
| CN | 112288310 | A | * | 1/2021 | |
| CN | 113191671 | A | * | 7/2021 | G06Q 10/06311 |
| CN | 113379324 | A | | 9/2021 | |
| CN | 113435939 | A | * | 9/2021 | G06Q 50/08 |
| CN | 115081522 | A | | 9/2022 | |
| CN | 115512104 | A | | 12/2022 | |
| CN | 115564027 | A | | 1/2023 | |
| CN | 115688937 | A | | 2/2023 | |
| CN | 115761362 | A | | 3/2023 | |
| CN | 115953666 | A | | 4/2023 | |
| CN | 116341875 | A | * | 6/2023 | G06Q 10/06313 |
| JP | 2023064882 | A | | 5/2023 | |
| WO | WO-2022026520 | A1 | * | 2/2022 | G06N 3/0464 |
| WO | WO 2023/093623 | A1 | | 6/2023 | |

OTHER PUBLICATIONS

Mostafa, Kareem, and Tarek Hegazy. "Review of image-based analysis and applications in construction." Automation in Construction 122 (2021): 103516. (Year: 2021).*
Park, Seula, and Ahram Song. "Hybrid approach using deep learning and graph comparison for building change detection." GIScience & Remote Sensing 60.1 (2023): 2220525. (Year: 2023).*
Liu, Shicheng, et al. "Application of artificial neural networks in construction management: Current status and future directions." Applied Sciences 11.20 (2021): 9616. (Year: 2021).*
Dimitrov, Andrey, and Mani Golparvar-Fard. "Vision-based material recognition for automated monitoring of construction progress and generating building information modeling from unordered site image collections." Advanced Engineering Informatics 28.1 (2014 ): 37-49. (Year: 2014).*
Yang, Jun, et al. "Construction performance monitoring via still images, time-lapse photos, and video streams: Now, tomorrow, and the future." Advanced Engineering Informatics 29.2 (2015): 211-224. (Year: 2015).*
Wang, Wei, and Min Zhang. "Tensor deep learning model for heterogeneous data fusion in Internet of Things." IEEE Transactions on emerging topics in computational intelligence 4.1 (2018): 32-41. (Year: 2018).*
Ranganathan, Hiranmayi, et al, "Multimodal Emotion Recognition using Deep Learning Architectures," Center for Cognitive Ubiquitous Computing, Arizona State University, Mar. 2019, pp. 1-9, Arizona State University.
Jianwei, Liu, et al., "Survey of multimodal deep learning," Dept. of Automation, China University of Petroleum, Jun. 2020, pp. 1601-1613, vol. 37 No. 6, China Academic Journal Electronic Publishing House.
First Office Action, Chinese Application No. 202310788030.2.
Second Office Action, Chinese Application No. 202310788030.2.

* cited by examiner

METHOD FOR CONTROLLING ACTUAL CONSTRUCTION OF A CONSTRUCTION SITE BASED ON MULTI-MODALITY TEMPORAL INFORMATION FUSION, AND ELECTRONIC DEVICE

CROSS-REFERENCE TO RELATED APPLICATION(S)

This application claims priority to Chinese Patent Application No. 202310788030.2 filed Jun. 30, 2023, the disclosure of which is incorporated herein by reference in its entirety.

TECHNICAL FIELD

Embodiments of the present disclosure relate to the field of computer technologies, and in particular, to an engineering progress determination method and apparatus based on a multi-modality temporal information fusion.

BACKGROUND

With the continuous development of computer technologies, smart sites are widely applied, which brings great convenience to various building site projects.

In this stage, the construction progress is determined mainly according to the acquired image information, and this method is relatively low in accuracy and relatively poor in flexibility.

How to accurately determine the engineering progress based on the multi-modality information of the construction site is the key problem of research in the industry.

SUMMARY

An embodiment of the present disclosure provides an engineering progress determination method and apparatus based on a multi-modality temporal information fusion technique.

According to an aspect of embodiments of the present disclosure, an engineering progress determination method based on a multi-modality temporal information fusion is provided. The method includes: acquiring current engineering progress information of multiple modalities and corresponding historical engineering progress information of multiple modalities for the current engineering progress information of multiple modalities; subsequently, extracting modality-specific temporal features from both current engineering progress information and historical engineering progress information; these modality-specific temporal features are then fed into a dimension decoupling-based multi-modality fusion module, resulting in fused multi-modality temporal information; and the current engineering progress is then determined based on this fused information.

According to another aspect of the embodiments of the present disclosure, an engineering progress determination apparatus based on a multi-modality temporal information fusion technique is provided. The apparatus includes an acquisition module, a temporal engineering feature extraction module, a multi-modality temporal information fusion module and a current engineering progress determination module. The acquisition module is configured to acquire current engineering progress information of multiple modalities and the historical engineering progress information of multiple modalities corresponding to the current engineering progress information of multiple modalities.

The modality-specific temporal feature extraction module is configured to separately extract modality-specific temporal features according to the current engineering progress information and the historical engineering progress information. The multi-modality temporal information extraction module is configured to input the modality-specific temporal features into a dimension decoupling-based multi-modality fusion module to obtain fused multi-modality temporal information. The current engineering progress determination module is configured to determine a current engineering progress according to the fused multi-modality temporal information.

According to another aspect of the embodiments of the present disclosure, an electronic device is provided. The electronic device includes at least one processor and a memory communicatively connected to the at least one processor. The memory stores a computer program executable by the at least one processor, and the computer program, when executed by the at least one processor, causes the at least one processor to perform the engineering progress determination method based on the multi-modality temporal information fusion described in any of the embodiments of the present disclosure.

According to another aspect of the embodiments of the present disclosure, a computer-readable storage medium is provided. The computer-readable storage medium stores a computer instruction, and the computer instruction is configured to, when executed by a processor, implement the engineering progress determination method based on the multi-modality temporal information fusion described in any of the embodiments of the present disclosure.

According to the technical scheme of the embodiments of the present disclosure, current engineering progress information of multiple modalities and the historical engineering progress information of multiple modalities corresponding to current engineering progress information of multiple modalities are acquired. Modality-specific temporal features are separately extracted according to the current engineering progress information and the historical engineering progress information. The modality-specific temporal features are input into the dimension decoupling-based multi-modality fusion module to obtain the fused multi-modality temporal information; and the current engineering progress is determined according to the fused multi-modality temporal information.

It should be noted that the contents described in this section are not intended to identify key or critical features of the embodiments of the present disclosure, nor intended to limit the scope of the embodiments of the present disclosure. Other features of the embodiments of the present disclosure will be readily understood from the following description.

BRIEF DESCRIPTION OF DRAWINGS

In order to more clearly explain technical schemes in embodiments of the present disclosure, the drawings used for describing the embodiments will be briefly introduced below. Obviously, the drawings in the following description are some embodiments the present disclosure. For those of ordinary skill in the art, other drawings may also be obtained without creative labor according to these drawings.

DETAILED DESCRIPTION

In order that those skilled in the art will better understand the schemes of embodiments of the present disclosure, the technical schemes of the embodiments of the present disclosure will be clearly and completely described below in conjunction with the accompanying drawings of the embodiments of the present disclosure. Apparently, the described embodiments are merely some embodiments of the embodiments of the present disclosure, rather than all of the embodiments. All other embodiments obtained by those of ordinary skill in the art based on the embodiments of the present disclosure without needing creative efforts shall all fall in the scope of protection of the embodiments of the present disclosure.

It should be noted that the terms "first", "second" and the like in the description and claims of the embodiments of the present disclosure, and in the foregoing drawings, are used for distinguishing between similar objects and not necessarily for describing a particular order or sequential order. It should be noted that the data so used are interchangeable as appropriate so that the embodiments of the present disclosure described herein can be implemented in an order other than those illustrated or described herein. Moreover, the terms "include" and "have" as well as any variations thereof, are intended to cover a non-exclusive inclusion, for example, a process, a method, a system, a product, or a device that includes a series of steps or units is not necessarily limited to those steps or units expressly listed, but may include other steps or units not expressly listed or inherent to such process, method, product, or device.

Embodiment One

Figure 1:
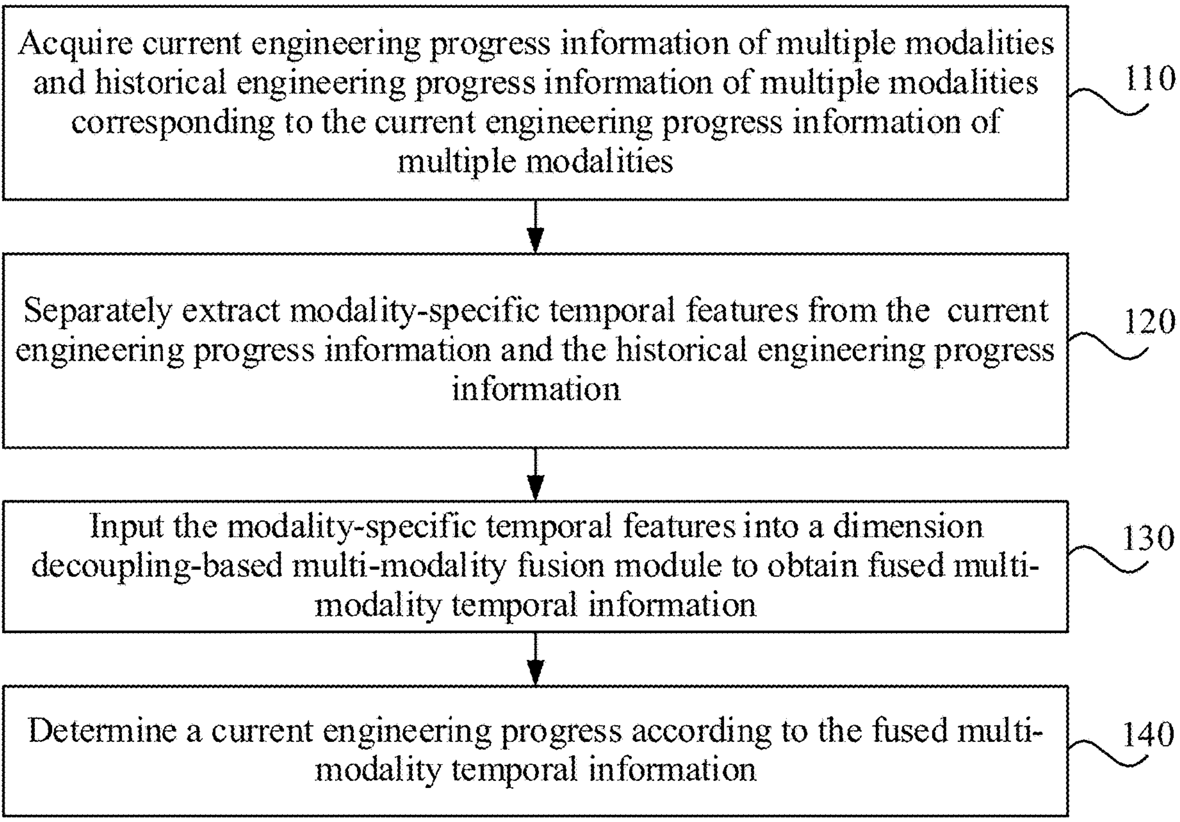
FIG. 1 is a flowchart of an engineering progress determination method based on a multi-modality temporal information fusion according to an embodiment one of the present disclosure.

FIG. 1 is a flowchart of an engineering progress determination method based on a multi-modality temporal information fusion according to an embodiment one of the present disclosure. This embodiment may be applicable to determining an engineering progress of a project based on multi-modality information of a construction site. The method may be performed by an engineering progress determination apparatus based on a multi-modality temporal information fusion. The engineering progress determination apparatus based on the multi-modality temporal information fusion may be implemented in a form of hardware and/or software. The engineering progress determination apparatus based on the multi-modality temporal information fusion may be configured in an electronic device such as a computer, a server, or a tablet computer. Specifically, referring to FIG. 1, the method specifically includes the following steps.

In step 110, current engineering progress information of multiple modalities and historical engineering progress information of multiple modalities corresponding to current engineering progress information of multiple modalities are acquired.

The current engineering progress information of multiple modalities may include at least one of construction site image information, construction site personnel composition information, or construction site building material warehousing information.

In an optional implementation manner of this embodiment, the construction site image information collected by a camera, the construction site personnel composition information, and the construction site building material warehousing information may be simultaneously acquired from a local database of the construction site.

It should be noted that the construction site image information may include information about each region of the construction site, such as, material used on the construction site, and field personnel distribution. The construction site personnel composition information may include several personnel of different types of work, such as, 100 tile workers, 120 carpentry workers, and 30 electrician workers. The construction site building material warehousing information may include warehousing-in and warehousing-out conditions of each piece of building material in the construction site warehouse, such as 10 tons of warehousing-in cement, 6 tons of warehousing-out cement, which is not limited in this embodiment.

In this embodiment, the historical engineering progress information corresponding to the current engineering progress information of each modality may be engineering progress information of the previous several months, such as, the previous two months, the previous three months, or the previous six months, which is not limited in this embodiment. Exemplarily, if the current engineering progress information of a modality is the construction site image information of the current month, then the historical engineering progress information of the modality corresponding to the current engineering progress information of the modality may be the construction site image information of the previous two months; if the current engineering progress information of a modality is the construction site personnel composition information of the current month, then the historical engineering progress information of the modality corresponding to the current engineering progress information of the modality may be the construction site personnel composition information of the previous two months; and if the current engineering progress information of a modality is the construction site building material warehousing information of the current month, then the historical engineering progress information of the modality corresponding to the current engineering progress information of the modality may be the construction site building material warehousing information of the previous two months.

In step 120, modality-specific temporal features are extracted separately from the current engineering progress information and the historical engineering progress information corresponding to the current engineering progress information.

In an optional implementation manner of this embodiment, after the current engineering progress information of multiple modalities and the historical engineering progress information of multiple modalities corresponding to the current engineering progress information of multiple modality are obtained, modality-specific temporal features may be extracted separately from the current engineering progress information and the historical engineering progress information.

Optionally, in this embodiment, that the modality-specific temporal features are extracted separately from the current engineering progress information and the historical engineering progress information includes: the current engineering progress information of each modality and the historical project progress information corresponding to the current engineering progress information of each modality are sorted according to a time sequence to obtain temporal engineering progress information of each modality; and the temporal engineering progress information of each modality is input into a modality-specific temporal feature extraction module for feature extraction to obtain modality-specific temporal features.

The modality-specific temporal features include at least one of the temporal construction site image information, temporal construction site personnel composition information, or temporal construction site building material warehousing information, which is not limited in this embodiment.

Optionally, in this embodiment, that the temporal engineering progress information is input into the modality-specific temporal feature extraction module for the feature extraction to obtain the modality-specific temporal features may include: information that satisfies a timing difference threshold in the temporal engineering progress information of each modality is captured by the modality-specific temporal feature extraction module based on a self-attention mechanism, and a target weight is allocated to the information that satisfies the timing difference threshold; and the modality-specific temporal features are obtained according to the target weight.

In an optional implementation manner of this embodiment, the construction site image information of the current month about the engineering progress to be predicted and the construction site image information of two month before the current month may be collected, and the image information of the three months is arranged according to a time sequence to form the temporal construction site image information of a modality. The construction site personnel composition information of the current month about an engineering progress to be predicted and the construction site personnel composition information of two months before the current month are also collected, and the construction site personnel composition information of the three months is arranged according to a time sequence to form the temporal construction site personnel composition information of a modality. The construction site building material warehousing information of the current month about an engineering progress to be predicted and the construction site building material warehousing information of two months before the current month are also collected, and the construction site building material warehousing information of the three months is arranged according to a time sequence to form the temporal construction site building material warehousing information of a modality.

Further, the above-described temporal engineering progress information of multiple modalities (such as the temporal construction site image information, the temporal construction site personnel composition information and the temporal construction site building material warehousing information) may be separately sent to the modality-specific temporal feature extraction module, and temporal information is encoded in each modality to obtain a feature with a shape of L×D, where L is a length of a timing sequence of the modality-specific temporal feature after a timing coding, and D is a number of feature channels. Specifically, the information with the largest timing difference of each modality data set within three months is captured by the modality-specific temporal feature extraction module by using the self-attention mechanism mainly, and the information with the largest timing difference is given with larger weight, so that the features changing on the timing are taken into consideration comprehensively by the subsequent project progress prediction task, and the project progress in the current month can be predicted more accurately. In addition, in this embodiment, a prediction result that does not conform to a reality logic, such as engineering progress retrogression, which may occur while only using single-time point information, can be avoided by using a model by using temporal information. Illustratively, for an input X of a modality, the modality-specific temporal feature extraction module specifically performs the following operations:

$$K = W_K * \mathrm{LN}(X);$$

$$Q = W_Q * \mathrm{LN}(X);$$

$$V = W_V * \mathrm{LN}(X);$$

$$V = \frac{Softmax(K * Q^T)}{\sqrt{d_k}} * V + X;$$

$$\mathrm{Output} = \mathrm{Linear}(\mathrm{Tanh}(\mathrm{Linear}(\mathrm{LN}(V)))) + V;$$

where $W_k$, $W_Q$ and $W_V$ are all learned parameter matrices, $d_k$ is a number of feature dimensions of K, LN ( ) is a layer regularization operation, Linear ( ) is a linear layer with offset, and both Softmax ( ) and Tanh ( ) are corresponding activation functions.

In step 130, the modality-specific temporal features are input into a dimension decoupling-based multi-modality fusion module to obtain fused multi-modality temporal information.

In an optional implementation manner of this embodiment, after it is determined to obtain the modality-specific temporal features, each obtained modality-specific temporal feature may be further input to the dimension decoupling-based multi-modality fusion module involved in this embodiment to obtain the fused multi-modality temporal information.

In an optional implementation manner of this embodiment, that the modality-specific temporal features are input into the dimension decoupling-based multi-modality fusion module to obtain the fused multi-modality temporal information may include that: the modality-specific temporal features are combined into one three-dimensional space tensor through the dimension decoupling-based multi-modality fusion module; and a dimension decoupling is performed on the one three-dimensional space tensor, and multi-modality temporal information is obtained in a decoupled three-dimensional space tensor.

Optionally, in this embodiment, after the L×D modality-specific temporal feature of each modality is obtained, the L×D modality-specific temporal feature of each modality needs to be stacked and spliced according to the modality dimension so as to form a cubic tensor of M×L×D. Then, the feature information of the cubic tensor of M×L×D needs to be further fused and extracted by using the proposed lightweight multi-modality information fusion module based on a pure linear layer. Firstly, a three-dimensional feature of M×L×D is rearranged to a two-dimensional feature X of MD×L, and then a feature transformation is performed only on a dimension where L is located by using the linear layer, to obtain further fused timing sequence feature information. The feature transformation process is specifically: X'=W1×X+B1, where W1 is a learnable parameter of an L×L" shape, and B1 is a learnable offset of an L" shape. Then the time dimension is mapped to a desired length by using another transformation, i.e., X"=W2×X'+B2, where W2 is a learnable parameter of an L"×L' shape, and B2 is a learnable parameter of an L' shape. In this way, a feature of an MD×L' shape may be obtained. After the transformed two-dimensional feature of MD×L' is restored to a three-dimensional feature of M×L'×D, the three-dimensional feature of M×L'×D is rearranged to a two-dimensional feature of DL'×M, and then the feature transformation described above is performed only on a dimension where M is located by using the linear layer, to obtain the multi-modality fusion feature information after inter-modal interaction, and the transformed two-dimensional feature of DL'×M' is restored to a three-dimensional feature of M'×L'×D. Finally, the three-dimensional feature of M'×L'×D is rearranged to a two-dimensional feature of M'L'×D, and then the feature transformation described above is performed on a dimension where D is located by using the linear layer to obtain a richer feature expression, and the transformed two-dimensional feature of M'L'×D' is restored to a three-dimensional feature of M'×L'×D'.

Further, after an information interaction is separately completed in the three dimensions, the information further needs to be input for multiple times to the dimension decoupling-based multi-modality fusion module for processing, such as two times or three times. In this way, it can be ensured that each voxel in the space of M×L×D can interact with other voxels, to implement the effect consistent with directly performing a linear transformation on the whole M×L×D tensor.

It should be noted that in the dimension decoupling-based multi-modality fusion module involved in this embodiment, modality-specific temporal features of three different modes are firstly combined into one three-dimensional space tensor, and then the dimension decoupling is performed, so as to implement the further information exchange and feature fusion between modes, feature channels, and timing from each dimension of the feature tensor.

Optionally, in this embodiment, X1, X2, and X3 are input to the three modes through the dimension decoupling-based multi-modality fusion module, and specific operation steps of the module are as follows:

$$X_a = Concat(X_1, X_2, X_3) \in R^{M*D*L};$$

$$X_L = \mathrm{reshape}(X_a, [M*D, L]) \in R^{MD*L};$$

$$X_L'' = \mathrm{Linear}(\mathrm{Re}LU(\mathrm{Linear}(X_L) + \mathrm{Bias}_L')) + \mathrm{Bias}_L'' \in R^{MD*L''};$$

$$X_M = \mathrm{reshape}(X_L'', [D*L'', M]) \in R^{DL''*M};$$

$$X_M'' = \mathrm{Linear}(\mathrm{Re}LU(\mathrm{Linear}(X_M) + \mathrm{Bias}_M')) + \mathrm{Bias}_M'' \in R^{DL''*M''};$$

$$X_D = \mathrm{reshape}(X_M'', [L''*M'', D]) \in R^{L''M''*D};$$

$$X_D'' = \mathrm{Linear}(\mathrm{Re}LU(\mathrm{Linear}(X_D) + \mathrm{Bias}_D')) + \mathrm{Bias}_D'' \in R^{L''M''*D''};$$

$$\mathrm{Output} = \mathrm{reshape}(X_D'', [M'', L'', D''];$$

where Concat ( ) is a matrix splicing function, reshape ( ) is a matrix element rearrangement function, ReLU ( ) is a corresponding activation function, and Bias is a learnable induction paranoid vector. It can be learned from the foregoing formula that, compared with the conventional method, that is, fusion is performed directly on the whole feature tensor, spatial complexity required by an algorithm is greatly reduced from O (M×L×D) to O (max (M, L, D)) in the solution proposed in the present disclosure, and the calculation efficiency is improved. Therefore, the solution proposed in the present disclosure is more suitable for an edge calculation device common in the construction site.

In this embodiment, the dimension decoupling-based multi-modality temporal feature fusion module finally converts the tensor in the hidden space of $R^{M\times D\times L}$ into a new hidden space of $R^{M''\times D''\times L''}$, where M", D" and L" are all super parameters that may be customized. However, whether M", D" or, L", in this embodiment, a set value should be greater than or equal to max(min(M,L,D), rank (Xa)), in this way, the serious information loss can be avoided. Rank (Xa) is a rank of a three-dimensional tensor $X_a$ obtained after Concat ( ) operation, and is defined as a minimum number of rank one tensors generated in a linear combination. Moreover, since L and D are often far greater than M, L" and D" also should be less than or equal to Land D respectively in parameter setting. By default, the values of M", L" and D" are all set to M, so as to achieve the purpose of consuming only the lowest calculation cost. It should be noted that, in a practical case, the three parameters may also be dynamically adjusted according to the performance of the edge calculation device on the premise that the foregoing requirement is satisfied.

In an optional implementation manner of this embodiment, before the fused multi-modality temporal information is obtained, the method further includes: an output result of the dimension decoupling-based multi-modality fusion module is continuously input into a next dimension decoupling-based multi-modality fusion module until a preset stopping condition is satisfied.

It should be noted that, after the first temporal information multi-modality fusion module processes each modality-specific temporal feature, the model initially extracts a place in which data in a current month is significantly different from data in the previous two months, and the information interaction is generated in the decoupled dimensions. Then, the output result further needs to be sent to a second temporal information multi-modality fusion module, so as to locate the change degree information of the key difference feature on the feature tensor obtained after the first temporal information multi-modality fusion module performs a preliminary coding, so that the multi-modality feature information that previously interacts only on each decoupling dimension generates further internal information interaction to achieve more comprehensive information fusion. In this case, since each element has information interaction with an element in a row direction, a column direction, and a depth direction, a feature fusion based on a dimension decoupling is performed again in the second temporal information multi-modality fusion module, so that indirect interaction between each element and all remaining elements can be achieved. Therefore, in an actual production application, it needs to be ensured that the temporal information multi-modality fusion module performs at least two consecutive times. Unlike a previous operation that a tensor in the hidden space of $R^{M\times D\times L}$ is projected to a new $R^{M''\times L''\times D''}$, operations thereafter are transformed in a fixed hidden space of $R^{M''\times D''\times L''}$, so that the consumption of the calculation resources can be reduced to a maximum extent. In addition, since the original three independent modes have been combined into a fused three-dimensional tensor after passing through the first temporal information multi-modality fusion module, the temporal feature extraction module in the second temporal information multi-modality fusion module will also become responsible for extracting the temporal information separately for the three-dimensional tensor in the new space of $R^{L\times\times M''\times D''}$ in terms of the L dimension.

In this embodiment, X' is reshaped into a two-dimensional feature of (M"L"×D×) firstly. The following formula is the same as that in the foregoing step. Apparently, the finally obtained output also needs to be converted back to a three-dimensional matrix with a shape of (M"××L"×D") by using the reshape ( ) function, so that a subsequent dimension decoupling-based multi-modality fusion module is accepted as an input.

It should be noted that, in this embodiment, in order to implement the more accurate and comprehensive construction progress prediction, an output of the second temporal information multi-modality fusion module needs to be further input to a third temporal information multi-modality fusion module. The module is further configured to evaluate whether the changed value of a key change feature may be considered as having reached a threshold that marks the project entering into a next construction stage. Then, an output of the third temporal information multi-modality fusion module is input to a fourth temporal information multi-modality fusion module, and the information fusion is performed according to whether each key changed feature reaches a threshold that indicates whether the project enters into a next construction stage, to comprehensively determine a construction progress of a current project as a whole. A structure of the third temporal information multi-modality fusion module and a structure of the fourth temporal information multi-modality fusion module are consistent with a structure of the second temporal information multi-modality fusion module.

In step 140, a current engineering progress is determined according to the fused multi-modality temporal information.

In an optional implementation manner of this embodiment, after the fused multi-modality temporal information is obtained, the current engineering progress can be further determined according to the fused multi-modality temporal information.

It should be noted that, in this embodiment, the fused multi-modality temporal information is one three-dimensional tensor. Further, that the current engineering progress is determined according to the fused multi-modality temporal information may include: the fused multi-modality temporal information is unfolded into one one-dimensional vector; and the one-dimensional vector is input into a classifier to obtain the current engineering progress.

Optionally, in an optional implementation manner of this embodiment, a tensor of a shape of M"×L"×D" is reshaped or expanded into a one-dimensional vector of M"L"D", is connected to one linear classifier, and each possible construction stage is evaluated in terms of possibility according to input information of the fourth temporal information multi-modality fusion module, and finally, a construction progress with a maximum corresponding possibility is output as a final prediction result for the construction progress of the current project.

According to the schemes of this embodiment, the construction progress information may be predicted more accurately. A conventional method is based on the image input only, and is prone to output the inaccurate prediction due to a problem such as field of view occlusion. Since the construction progress progresses gradually with time, it is impossible to reverse the progress after one month, whereby the temporal construction progress information may be used to obtain more reasonable and accurate prediction results, and thus more efficient multi-modality temporal information fusion can be implemented. In the conventional method, all dimensions are mixed together for processing, so that a large computation amount is generated, and it is difficult for the model to extract the valid information from complex inputs.

According to the technical scheme of this embodiment, the current engineering progress information of multiple modalities and the historical engineering progress information of multiple modalities corresponding to the current engineering progress information of multiple modalities are acquired; the modality-specific temporal features are separately extracted from the current engineering progress information and the historical engineering progress information; the modality-specific temporal features are input into the dimension decoupling-based multi-modality fusion module to obtain the fused multi-modality temporal information; and the current engineering progress is determined according to the fused multi-modality temporal information, so that the engineering progress can be determined accurately based on the multi-modality information of the construction site.

Figure 2:
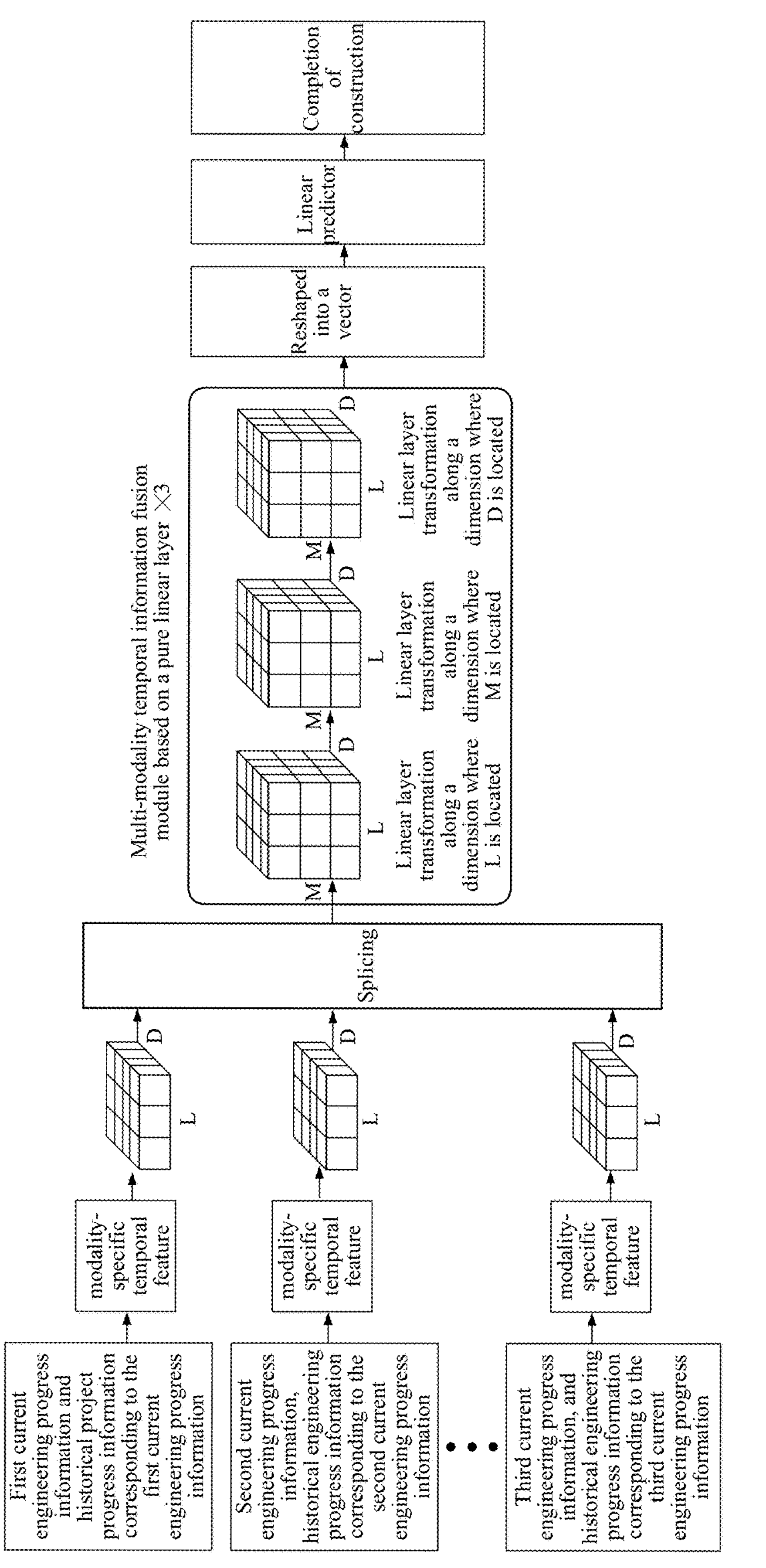
FIG. 2 is a schematic diagram of an overall process of the engineering progress determination method based on a multi-modality temporal information fusion according to an embodiment one of the present disclosure.

In order to better understand the engineering progress determination method based on the multi-modality temporal information fusion involved in this embodiment, FIG. 2 is a schematic diagram of an overall process of an engineering progress determination method based on a multi-modality temporal information fusion according to an embodiment one of the present disclosure. In FIG. 2, first current engineering progress information and historical engineering progress information corresponding to the first current engineering progress information may be engineering progress information of a modality; second current engineering progress information and historical engineering progress information corresponding to the second current engineering progress information may be engineering progress information of a modality; third current engineering progress information and historical engineering progress information corresponding to the third current engineering progress information may be engineering progress information of a modality; these engineering progress information of each modality may be any engineering progress information, such as, construction site image information, construction site personnel composition information, and construction site building material warehousing information.

Referring to FIG. 2, in this embodiment, engineering progress information of each modality is firstly separately processed. For example, for engineering image information of each month, a feature is firstly extracted by using a convolutional neural network, and then temporal data is formed according to a feature of this month and a feature of the last two months, and temporal information therein is extracted from the temporal data by using the modality-specific temporal feature extraction module to form a L×D feature for the engineering image modality, where L is a feature sequence length, and D is a number of feature channels.

Further, after the L×D temporal feature of each mode is obtained, the L×D temporal feature of each modality needs to be stacked and spliced according to the modality dimension so as to form a cubic tensor of M×L×D. Then, the cubic tensor of M×L×D needs to be further fused to obtain the fused feature information by using the proposed lightweight multi-modality information fusion module based on a pure linear layer. Further, the fused feature information may be expanded to a one-dimensional vector, and a final construction progress identification result is obtained by using a linear predictor.

Embodiment Two

Figure 3:
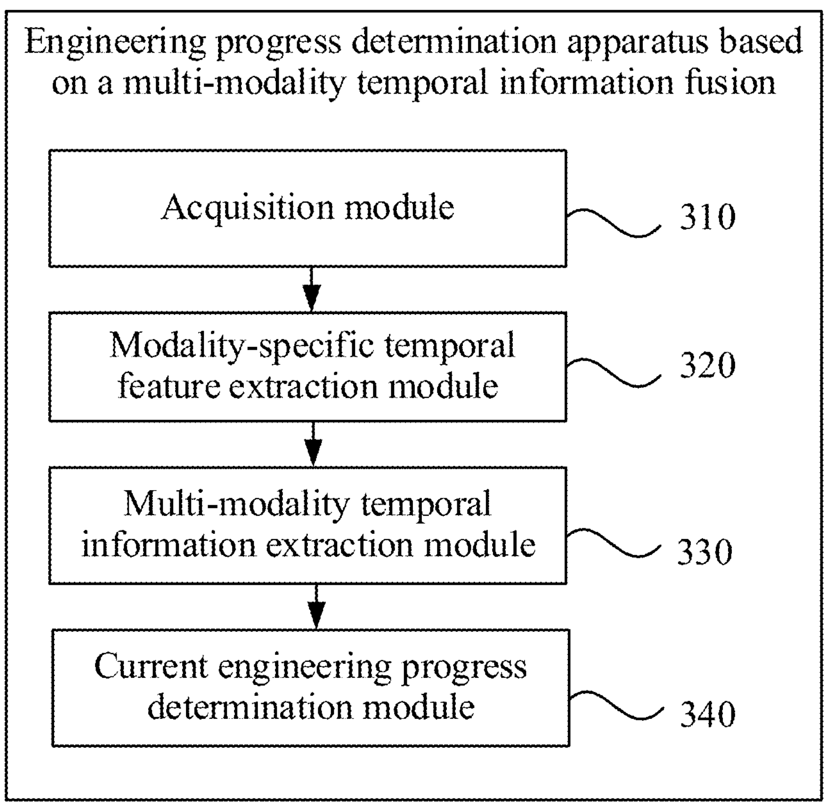
FIG. 3 is a schematic structural diagram of an engineering progress determination apparatus based on a multi-modality temporal information fusion according to an embodiment two of the present disclosure.

FIG. 3 is a schematic structural diagram of an engineering progress determination apparatus based on a multi-modality temporal information fusion according to an embodiment two of the present disclosure. As shown in FIG. 3, the apparatus includes an acquisition module 310, a modality-specific temporal feature extraction module 320, a multi-modality temporal information extraction module 330 and a current engineering progress determination module 340.

The acquisition module 310 is configured to acquire current engineering progress information of multiple modalities and historical engineering progress information of multiple modalities corresponding to current engineering progress information of multiple modalities.

The modality-specific temporal feature extraction module 320 is configured to separately extract modality-specific temporal features from the current engineering progress information and the historical engineering progress information.

The multi-modality temporal information extraction module 330 is configured to input the modality-specific temporal features into a dimension decoupling-based multi-modality fusion module to obtain fused multi-modality temporal information.

The current engineering progress determination module 340 is configured to determine a current engineering progress according to the fused multi-modality temporal information.

According to the scheme of this embodiment, the current engineering progress information of multiple modalities and the historical engineering progress information of multiple modalities corresponding to the current engineering progress information of multiple modalities are acquired; the modality-specific temporal features are separately extracted from the current engineering progress information and the historical engineering progress information; the modality-specific temporal features are input into the dimension decoupling-based multi-modality fusion module to obtain the fused multi-modality temporal information; and the current engineering progress is determined according to the fused multi-modality temporal information, so that the engineering progress can be determined accurately based on the multi-modality information of the construction site.

In an optional implementation manner of this embodiment, the current engineering progress information of multiple modalities includes at least one of construction site image information, construction site personnel composition information, or construction site building material warehousing information.

In an optional implementation manner of this embodiment, the modality-specific temporal feature extraction module 320 is specifically configured to: sort the current engineering progress information of each modality and the historical project progress information corresponding to the current engineering progress information of each modality according to a time sequence to obtain temporal engineering progress information of each modality; and input the temporal engineering progress information of each modality into a modality-specific temporal feature extraction module for a feature extraction to obtain modality-specific temporal features.

In an optional implementation manner of this embodiment, the modality-specific temporal feature extraction module 320 is further specifically configured to: capture, by the modality-specific temporal feature extraction module, based on a self-attention mechanism, information that satisfies a timing difference threshold in the temporal engineering progress information of each modality, and allocate a target weight to the information that satisfies the timing difference threshold; and obtain the modality-specific temporal features according to the target weight.

In an optional implementation manner of this embodiment, the multi-modality temporal information extraction module 330 is specifically configured to: combine the modality-specific temporal features into one three-dimensional space tensor through the dimension decoupling-based multi-modality fusion module; and perform a dimension decoupling on the one three-dimensional space tensor, and obtain multi-modality temporal information in a decoupled three-dimensional space tensor.

In an optional implementation manner of this embodiment, the multi-modality temporal information extraction module 330 is further specifically configured to: continuously input an output result of the dimension decoupling-based multi-modality fusion module into a next dimension decoupling-based multi-modality fusion module until a preset stopping condition is satisfied.

In an optional implementation manner of this embodiment, the fused multi-modality temporal information is one three-dimensional tensor.

Optionally, the current engineering progress determination module 340 is specifically configured to: expand the fused multi-modality temporal information into one one-dimensional vector; and input the one-dimensional vector into a classifier to obtain the current engineering progress.

The engineering progress determination apparatus based on the multi-modality temporal information fusion provided in the embodiments of the present disclosure may perform the engineering progress determination method based on the multi-modality temporal information fusion provided in any of the embodiments of the present disclosure, and has corresponding function modules and beneficial effects for executing the method.

Embodiment Three

Figure 4:
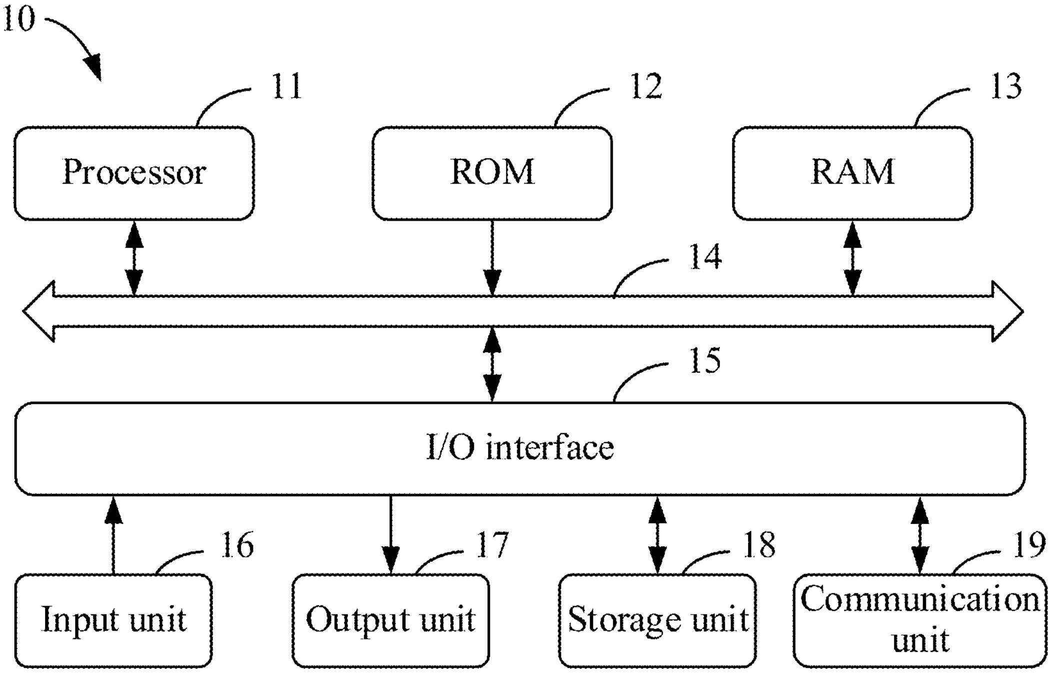
FIG. 4 is a schematic structural diagram of an electronic device that implements an engineering progress determination method based on a multi-modality temporal information fusion according to an embodiment of the present disclosure.

FIG. 4 shows a schematic structural diagram of an exemplary electronic device 10 that may be used for implementing the embodiments of the present disclosure. The electronic device is intended to represent various forms of digital computers, such as laptops, desktops, workstations, personal digital assistants, servers, blade servers, mainframe computers, and other appropriate computers. The electronic device may also represent various forms of mobile apparatuses, such as personal digital processing, cellular phones, smartphones, wearable devices (such as a helmet, glasses, and a watch), and other similar calculation apparatuses. The components shown in this specification, their connections and relationships between these components, and the functions of these components, are illustrative only and are not intended to limit implementations of the embodiments of the present disclosure described and/or claimed herein.

As shown in FIG. 4, the electronic device 10 includes at least one processor 11 and a memory communicatively connected to the at least one processor 11, such as a read-only memory (ROM) 12 and a random access memory (RAM) 13. The memory stores a computer program that may be executed by the at least one processor. The processor 11 may perform various appropriate actions and processing according to a computer program stored in the read-only memory (ROM) 12 or a computer program loaded from the storage unit 18 to the random access memory (RAM) 13. In the RAM 13, various programs and data required for the operation of the electronic device 10 may be further stored. The processor 11, the ROM 12, and the RAM 13 are connected to each other by using a bus 14. The input/output (I/O) interface 15 is also connected to the bus 14.

Multiple components in the electronic device 10 are connected to an I/O interface 15. The multiple components include: an input unit 16, such as a keyboard and a mouse; an output unit 17 such as various types of displays and speakers; a storage unit 18 such as a magnetic disk or an optical disc; and a communications unit 19, such as a network card, a modem, and a wireless communications transceiver. The communications unit 19 allows the electronic device 10 to exchange information/data with other device by using the computer network such as the Internet and/or various telecommunication networks.

The processor 11 may be a variety of general-purpose and/or dedicated processing assemblies having processing and calculation capabilities. Some examples of the processor 11 include, but are not limited to, a central processing unit (CPU), a graphics processing unit (GPU), a variety of special-purpose artificial intelligence (AI) calculation chips, a variety of processors running machine learning model algorithms, a digital signal processor (DSP), and any suitable processor, controller, microcontroller, and the like. The processor 11 performs the foregoing methods and processing, such as, the engineering progress determination method based on the multi-modality temporal information fusion.

In some embodiments, the engineering progress determination method based on the multi-modality temporal information fusion may be implemented as a computer program, and the computer program is materially included in a computer-readable storage medium such as a storage unit 18. In some embodiments, part or all of computer programs may be loaded and/or installed on the electronic device 10 via the ROM 12 and/or the communications unit 19. When the computer program is loaded into the RAM 13 and executed by the processor 11, one or more steps of the engineering progress determination method based on the multi-modality temporal information fusion described above may be performed. Alternatively, in other embodiments, the processor 11 may be configured in any other suitable manner (such as, by means of firmware) to perform the engineering progress determination method based on the multi-modality temporal information fusion.

Various implementation manners of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), a computer hardware, a firmware, a software, and/or a combination thereof. These various implementation manners may include implementation in one or more computer programs, and the one or more computer programs are executable and/or interpretable on a programmable system including at least one programmable processor, the programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the methods of the embodiments of the present disclosure may be written in any combination of one or more programming languages. These program codes may be provided for the processor of a general-purpose computer, a special-purpose computer, or another programmable data processing apparatus to enable the functions/operations specified in a flowchart and/or a block diagram to be implemented when the program codes are executed by the processor. The program codes may be executed entirely on a machine, partly on the machine, as a stand-alone software package, partly on the machine and partly on a remote machine, or entirely on the remote machine or server.

In the context of the embodiments of the present application, a computer-readable storage medium may be a tangible medium that may contain or store a program available for an instruction execution system, apparatus or device or a program used in conjunction with an instruction execution system, apparatus or device. The computer-readable storage medium may include, but is not limited to, an electronic, magnetic, optical, electromagnetic, infrared, or semiconductor system, apparatus, or device, or any appropriate combination of the foregoing. Alternatively, the computer-readable storage medium may be a machine readable signal medium. More specific examples of the machine-readable storage medium may include an electrical connection based on one or more wires, a portable computer diskette, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any appropriate combination of the foregoing.

To provide the interaction with a user, the systems and technologies described here may be implemented on the electronic device. The electronic device has a display device (such as, a cathode-ray tube (CRT) or liquid-crystal display (LCD) monitor) for displaying information to the user; and a keyboard and a pointing apparatus (such as, a mouse or a trackball) through which the user may provide input to the electronic device. Other kinds of apparatuses may also be used for providing for interaction with the user, for example, feedback provided to the user may be sensory feedback in any form (such as, visual feedback, auditory feedback, or haptic feedback), and input from the user may be received in any form (including acoustic input, speech input, or haptic input).

The systems and technologies described here may be implemented in a calculation system including a back-end component (such as, a data server), or a calculation system including a middleware component (such as, an application server), or a calculation system including a front-end component (such as, a client computer having a graphical user interface or a web browser through which the user may interact with the implementation manners of the systems and technologies described herein), or a calculation system including any combination of such back-end component, middleware component, or front-end component. The components of the system may be interconnected by any form or medium of digital data communication (such as, a communication network). Examples of the communication network include a local area network (LAN), a wide area network (WAN), a blockchain network and the Internet.

A calculation system may include a client and a server. The client and the server are generally facing away from each other and typically interact through the communication network. A relationship between the client and the server arises by virtue of computer programs running on respective computers and having a client-server relationship to each other. The server may be a cloud server, also referred to as a cloud calculation server or a cloud host. As a host product in a cloud calculation service system, the server solves the defects of difficult management and weak service scalability in a traditional physical host and a virtual private server (VPS) service.

It should be noted that various forms of flows, reordering, adding or deleting steps shown above may be used. For example, as long as the desired result of the technical schemes of the embodiments of the present disclosure may be achieved, the steps recited in the embodiments of the present disclosure may be executed in parallel, sequentially or in different orders, which is not limited herein.

The above implementation manners should not be construed as limiting the scope of protection of the embodiments of the present disclosure. It should be noted by those skilled in the art that various modifications, combinations, sub-combinations and substitutions may be made depending on design requirements and other factors. Any modification, equivalent replacement, and improvement made within the spirit and principle of the embodiments of the present disclosure should be included within the scope of protection of the embodiments of the present disclosure.

What is claimed is:

1. A method for controlling actual construction of a construction site based on a multi-modality temporal information fusion, performed by at least one processor of an electronic device and comprising:

acquiring current engineering progress information and historical engineering progress information corresponding to each current engineering progress information from a local database, wherein the current engineering progress information comprises engineering progress information of a current month, and the historical engineering progress information comprises engineering progress information of previous several months of the current month;

separately determining modality-specific temporal features according to the each current engineering progress information and the historical engineering progress information corresponding to the each current engineering progress information;

inputting the modality-specific temporal features into a dimension decoupling-based multi-modality fusion module to obtain fused multi-modality temporal information; and expanding the fused multi-modality temporal information and determining a current engineering progress according to the fused multi-modality temporal information by using a linear predictor; and controlling actual construction of the construction site based on determined current engineering progress in real time, wherein the actual construction of the construction site comprises the use of material on the construction site;

wherein the current engineering progress information comprises at least two of the construction site image information, construction site personnel composition information, or construction site building material warehousing information; and the modality-specific temporal features comprise at least two of temporal construction site image information, temporal construction site personnel composition information, or temporal construction site building material warehousing information;

wherein separately determining the modality-specific temporal features according to the each current engineering progress information and the historical engineering progress information corresponding to the each current engineering progress information comprises:

sorting the each current engineering progress information and the historical project progress information corresponding to the each current engineering progress information according to a time sequence, extracting features of the engineering progress information of the current month and the engineering progress information of the previous several months by using a convolutional neural network to obtain a feature of the engineering progress information of the current month and features of the engineering progress information of the previous several months, and obtaining temporal engineering progress information according to a temporal data formed according to the feature of the engineering progress information of the current month and the features of the engineering progress information of the previous several months;

inputting the temporal engineering progress information into a modality-specific temporal feature extraction module, capturing, by the modality-specific temporal feature extraction module, based on a self-attention mechanism, information that satisfies a timing difference threshold in the temporal engineering progress information, and allocating a target weight to the information that satisfies the timing difference threshold; and obtaining the modality-specific temporal features according to the target weight;

wherein expanding the fused multi-modality temporal information and determining the current engineering progress according to the fused multi-modality temporal information by using the linear predictor comprises: expanding the fused multi-modality temporal information into one one-dimensional vector; and inputting the one-dimensional vector into a classifier to obtain the current engineering progress;

during a process of inputting the temporal engineering progress information into a modality-specific temporal feature extraction module for a feature extraction to obtain the modality-specific temporal features, for any input X of a modality, the modality-specific temporal feature extraction module is configured to perform the following operations:

$$K = W_K * LN(X);\ Q = W_Q * LN(X);\ V = W_V * LN(X);$$

$$V = \frac{\mathrm{Softmax}(K * Q^T)}{\sqrt{d_k}} * V + X;$$

$$\mathrm{Output} = \mathrm{Linear}(\mathrm{Tanh}(\mathrm{Linear}(LN(V)))) + V;$$

where $W_k$, $W_Q$ and $W_V$ are all learned parameter matrices, $d_k$ is a number of feature dimensions of K, LN ( ) is a layer regularization operation, Linear ( ) is a linear layer with offset, and both Softmax ( ) and Tanh ( ) are corresponding activation functions;

during a process of inputting the modality-specific temporal features into a dimension decoupling-based multi-modality fusion module to obtain fused multi-modality temporal information, three inputs of X1, X2, and X3 of three modalities are operated based on the dimension decoupling-based multi-modality fusion module in following steps:

$$X_a = \mathrm{Concat}(X_1, X_2, X_3) \in R^{M*D*L};$$

$$X_L = \mathrm{reshape}(X_a, [M*D, L]) \in R^{MD*L};$$

-continued $$X''_L = \text{Linear}(ReLU(\text{Linear}(X_L)+\text{Bias}'_L)) + \text{Bias}''_L \in R^{MD*L''};$$

$$X_M = \text{reshape}(X''_L, [D*L'', M]) \in R^{DL''*M};$$

$$X''_M = \text{Linear}(ReLU(\text{Linear}(X_M)+\text{Bias}'_M)) + \text{Bias}''_M \in R^{DL''*M''};$$

$$X_D = \text{reshape}(X''_M, [L''*M'', D]) \in R^{L''M''*D};$$

$$X''_D = \text{Linear}(ReLU(\text{Linear}(X_D)+\text{Bias}'_D)) + \text{Bias}''_D \in R^{L''M''*D''};$$

$$\text{Output} = \text{reshape}(X''_D, [M'', L'', D''];$$

where Concat ( ) is a matrix splicing function, reshape ( ) is a matrix element rearrangement function, ReLU ( ) is a corresponding activation function, Bias is a learnable induction paranoid vector, and M, L, D are modality-specific temporal features of multi-modality respectively;

wherein the inputting the modality-specific temporal features into a dimension decoupling-based multi-modality fusion module to obtain fused multi-modality temporal information comprises:

combining the modality-specific temporal features into one three-dimensional space tensor through the dimension decoupling-based multi-modality fusion module; and performing a dimension decoupling on the one three-dimensional space tensor, and obtaining multi-modality temporal information in a decoupled three-dimensional space tensor.

2. The method of claim 1, before the fused multi-modality temporal information is obtained, the method further comprises:

continuously inputting an output result of the dimension decoupling-based multi-modality fusion module into a next dimension decoupling-based multi-modality fusion module until a preset stopping condition is satisfied.

3. The method of claim 1, wherein the fused multi-modality temporal information is one three-dimensional tensor.

4. An electronic device, comprising:

at least one processor; and a memory communicatively connected to the at least one processor;

wherein the memory stores a computer program executable by the at least one processor, and the computer program, when executed by the at least one processor, causes the at least one processor to perform a method for controlling actual construction of a construction site based on the multi-modality temporal information fusion;

wherein the method comprising:

acquiring current engineering progress information and historical engineering progress information corresponding to each current engineering progress information from a local database, wherein the current engineering progress information comprises engineering progress information of a current month, and the historical engineering progress information comprises engineering progress information of previous several months of the current month;

separately determining modality-specific temporal features according to the each current engineering progress information and the historical engineering progress information corresponding to the each current engineering progress information;

inputting the modality-specific temporal features into a dimension decoupling-based multi-modality fusion module to obtain fused multi-modality temporal information; and expanding the fused multi-modality temporal information and determining a current engineering progress according to the fused multi-modality temporal information by using a linear predictor; and controlling actual construction of the construction site based on determined current engineering progress in real time, wherein the actual construction of the construction site comprises the use of material on the construction site;

wherein the current engineering progress information comprises at least two of the construction site image information, construction site personnel composition information, or construction site building material warehousing information; and the modality-specific temporal features comprise at least two of temporal construction site image information, temporal construction site personnel composition information, or temporal construction site building material warehousing information;

wherein separately determining the modality-specific temporal features according to the each current engineering progress information and the historical engineering progress information corresponding to the each current engineering progress information comprises:

sorting the each current engineering progress information and the historical project progress information corresponding to the each current engineering progress information according to a time sequence, extracting features of the engineering progress information of the current month and the engineering progress information of the previous several months by using a convolutional neural network to obtain a feature of the engineering progress information of the current month and features of the engineering progress information of the previous several months, and obtaining temporal engineering progress information according to a temporal data formed according to the feature of the engineering progress information of the current month and the features of the engineering progress information of the previous several months;

inputting the temporal engineering progress information into a modality-specific temporal feature extraction module, capturing, by the modality-specific temporal feature extraction module, based on a self-attention mechanism, information that satisfies a timing difference threshold in the temporal engineering progress information, and allocating a target weight to the information that satisfies the timing difference threshold; and obtaining the modality-specific temporal features according to the target weight;

wherein expanding the fused multi-modality temporal information and determining the current engineering progress according to the fused multi-modality temporal information by using the linear predictor comprises: expanding the fused multi-modality temporal information into one one-dimensional vector; and inputting the one-dimensional vector into a classifier to obtain the current engineering progress;

during a process of inputting the temporal engineering progress information into a modality-specific temporal feature extraction module for a feature extraction to obtain the modality-specific temporal features, for any input X of a modality, the modality-specific temporal feature extraction module is configured to perform the following operations:

$$K = W_K * LN(X);\ Q = W_Q * LN(X);\ V = W_V * LN(X);$$

$$V = \frac{\text{Softmax}(K * Q^T)}{\sqrt{d_k}} * V + X;$$

$$\text{Output} = \text{Linear}(\text{Tanh}(\text{Linear}(LN(V)))) + V;$$

where $W_k$, $W_Q$ and $W_V$ are all learned parameter matrices, $d_k$ is a number of feature dimensions of K, LN ( ) is a layer regularization operation, Linear ( ) is a linear layer with offset, and both Softmax ( ) and Tanh ( ) are corresponding activation functions;

during a process of inputting the modality-specific temporal features into a dimension decoupling-based multi-modality fusion module to obtain fused multi-modality temporal information, three inputs of X1, X2, and X3 of three modalities are operated based on the dimension decoupling-based multi-modality fusion module in following steps:

$$X_a = \text{Concat}(X_1, X_2, X_3) \in R^{M*D*L};$$

$$X_L = \text{reshape}(X_a, [M*D, L]) \in R^{MD*L};$$

$$X_L'' = \text{Linear}(ReLU(\text{Linear}(X_L) + \text{Bias}_L')) + \text{Bias}_L'' \in R^{MD*L''};$$

$$X_M = \text{reshape}(X_L'', [D*L'', M]) \in R^{DL''*M};$$

$$X_M'' = \text{Linear}(ReLU(\text{Linear}(X_M) + \text{Bias}_M')) + \text{Bias}_M'' \in R^{DL''*M''};$$

-continued $$X_D = \text{reshape}(X_M'', [L''*M'', D]) \in R^{L''M''*D};$$

$$X_D'' = \text{Linear}(ReLU(\text{Linear}(X_D) + \text{Bias}_D')) + \text{Bias}_D'' \in R^{L''M''*D''};$$

$$\text{Output} = \text{reshape}(X_D'', [M'', L'', D'']);$$

where Concat ( ) is a matrix splicing function, reshape ( ) is a matrix element rearrangement function, ReLU ( ) is a corresponding activation function, Bias is a learnable induction paranoid vector, and M, L, D are modality-specific temporal features of multi-modality respectively;

wherein the inputting the modality-specific temporal features into a dimension decoupling-based multi-modality fusion module to obtain fused multi-modality temporal information comprises:

combining the modality-specific temporal features into one three-dimensional space tensor through the dimension decoupling-based multi-modality fusion module; and performing a dimension decoupling on the one three-dimensional space tensor, and obtaining multi-modality temporal information in a decoupled three-dimensional space tensor.

5. The electronic device of claim 4, before the fused multi-modality temporal information is obtained, the method further comprises:

continuously inputting an output result of the dimension decoupling-based multi-modality fusion module into a next dimension decoupling-based multi-modality fusion module until a preset stopping condition is satisfied.

6. The electronic device of claim 4, wherein the fused multi-modality temporal information is one three-dimensional tensor.

* * * * *